United States Patent [19]

Horiguchi et al.

[11] Patent Number: 4,852,639
[45] Date of Patent: Aug. 1, 1989

[54] AIR CONDITIONING SYSTEM FOR VEHICLE

[75] Inventors: Hyosei Horiguchi; Akira Tezuka, both of Katsuta; Shuuichi Seki, Ibaraki, all of Japan

[73] Assignee: Hitachi, Ltd., Tokyo, Japan

[21] Appl. No.: 181,067

[22] Filed: Apr. 13, 1988

[30] Foreign Application Priority Data

Apr. 13, 1987 [JP] Japan .................. 62-88829

[51] Int. Cl.[4] ............................................. B60H 3/06
[52] U.S. Cl. .................................. 165/42; 165/103; 237/12.3 A; 98/2.06
[58] Field of Search ................. 165/41, 42, 43, 103; 237/12.3 A, 12.3 B; 98/2.05, 2.06, 2.08

[56] References Cited

U.S. PATENT DOCUMENTS 4,407,354 10/1983 Takishita et al. .................. 165/42
4,531,671 7/1985 Schwenk ............................. 98/2.06
4,593,852 6/1986 Tajimce et al. ..................... 98/2.08

FOREIGN PATENT DOCUMENTS 58-32977 7/1983 Japan .
59-2669 1/1984 Japan .

Primary Examiner—Noah P. Kamen
Attorney, Agent, or Firm—Antonelli, Terry & Wands

[57] ABSTRACT

In an air conditioning system for a vehicle, a duct case has defined therewithin a cold-air passageway and a hot-air passageway. A heater is arranged within the duct case for heating air flowing through the hot-air passageway. An air-mixing damper is arranged for angular movement within the duct case at a location upstream of the heater, for adjusting flow rate of air passing through the cold-air passageway and flow rate of air passing through the hot-air passageway. A plurality of cold-air blowing openings open to the hot-air passageway at a location downstream of the heater. A cold-air bypass passage is provided for leading cold air before passing through the heater to the cold-air blowing openings. The cold air led by the cold-air bypass passage is blown from the cold-air blowing openings into flow of the hot air having passed through the heater such that the cold-air flow is intersected with the hot-air flow, thereby forcibly mixing the hot air and the cold air with each other.

20 Claims, 9 Drawing Sheets

AIR CONDITIONING SYSTEM FOR VEHICLE

BACKGROUND OF THE INVENTION

The present invention relates to air conditioning systems for vehicles and, more particularly, to an air conditioning system for a vehicle, having a heater unit with superior air mixing ability.

In conventional air conditioning systems for vehicles, as disclosed in Japanese Utility Model Publication Nos. 58-32977 and 59-2669, two air mixing dampers are arranged within an air passageway defined within a heater unit and are interlocked with each other to restrict the air passageway, thereby improving air mixing ability.

Further, various techniques have been proposed, in which a fixed air flow deflector is arranged within an air passageway in a heater unit to improve air mixing ability.

In general, the following three basic items (a) through (c) are required for the heater unit:

(a) Reduction in Size

The heater unit is arranged within an instrument panel. Various gages, radio, control switches, harness and the like are concentrated within the instrument panel, so that the interior of the instrument panel is most restricted by space. By this reason, the heater unit is required to be reduced in size.

(b) Air Mixing Ability

The heater unit is provided with a plurality of discharge openings connected, through respective ducts, to air blowing outlets which open to a vehicle compartment, such as defrost (DEF) outlets, ventilation (VENT) outlets, FLOOR outlets and the like. Each duct connected to a corresponding one of the discharge openings is usually divided into two to four branch duct sections which extend to the right and left. Accordingly, if air discharged through each discharge opening of the heater unit is not uniform in temperature, a temperature difference occurs between air passing through the right-hand duct sections and air passing through the left-hand duct sections, so that the air blown toward a passenger on the right-hand side has a different temperature from the air blown toward a passenger on the left-hand side. As a result, a difference in air-conditioning feeling occurs between the passengers on the right- and left-hand sides. The nonuniformity in temperature of the blown air cannot be avoided because hot air of about 80 degrees C and cold air of about 0 degree C are mixed with each other within the heater unit to form air of an appropriate temperature level. However, if the temperature variation of air blown from each discharge opening of the heater unit exceeds 10 degrees C, a practical problem. Thus, the temperature variation of the blown air is required to be within 10 degrees C. The magnitude of the temperature variation variation is called "air mixing ability". A reference to air mixing ability as high means that the temperature variation of the air at each discharge opening of the heater unit is small.

(c) Flow Resistance at Maximum Cooling and Heating

The higher the flow rate at which air is blown from each discharge opening at the maximum cooling and heating, the higher the performance of the air conditioning system. Accordingly, it is required to reduce air flow resistance at the maximum cooling and heating of the heater unit.

However, the above three basic requirements are contrary to each other, and if one of them is improved, the remaining two would be deteriorated.

The air conditioning systems disclosed in the above-mentioned Japanese Utility Model Publication Nos. 58-32977 and 59-2669 do not suggest an air mixing ability that is sufficiently high. In addition, in the above Japanese Utility models, some problems remain unsolved in the reduction of size of the system and in the reduction of flow resistance at maximum cooling and heating.

SUMMARY OF THE INVENTION

It is an object of the invention to provide an air conditioning system for a vehicle, which is small in size, high in air mixing ability, and simple in construction.

According to the invention, there is provided an air conditioning system for a vehicle, comprising:

a duct case provided with an inlet and discharge opening, the duct case having defined therewithin a cold-air passageway and a hot-air passageway which extend from the inlet toward the discharge opening;

a heater means arranged within the hot-air passageway for heating air flowing through the hot-air passageway from the inlet toward the discharge opening of the duct case;

an air-mixing damper arranged for angular movement within the duct case at a location upstream of the heater means, for adjusting flow rate of air passing through the cold-air passageway and flow rate of air passing through the hot-air passageway;

a mode switching damper arranged in association with the discharge opening provided in the duct case, for switching blowing modes; and an air mixer including a plurality of cold-air blowing openings which open to the hot-air passageway at a location downstream of the heater, and a cold-air bypass passage for leading cold air around the heater to the cold-air blowing openings, wherein the cold air led by the cold-air bypass passage is blown from the cold-air blowing openings into flow of hot air having passed through the heater in such a fashion that flow of the cold air from the cold-air blowing openings intersects the hot-air flow, thereby forcibly mixing the cold air and the hot air with each other.

DETAILED DESCRIPTION

FIGS. 1 through 8 show a first embodiment of an air conditioning system according to the invention in which an air-mixing mechanism is applied to a heater unit having an independent temperature adjusting function which can control temperature of air blown from FLOOR blowing outlets of the vehicle and temperature of air blown from VENT (ventilation) blowing outlets of the vehicle, independently of each other, at a B/L (bi-level) blowing mode in which temperature-controlled air is blown from both the FLOOR blowing outlets and the VENT blowing outlets.

Figure 1:
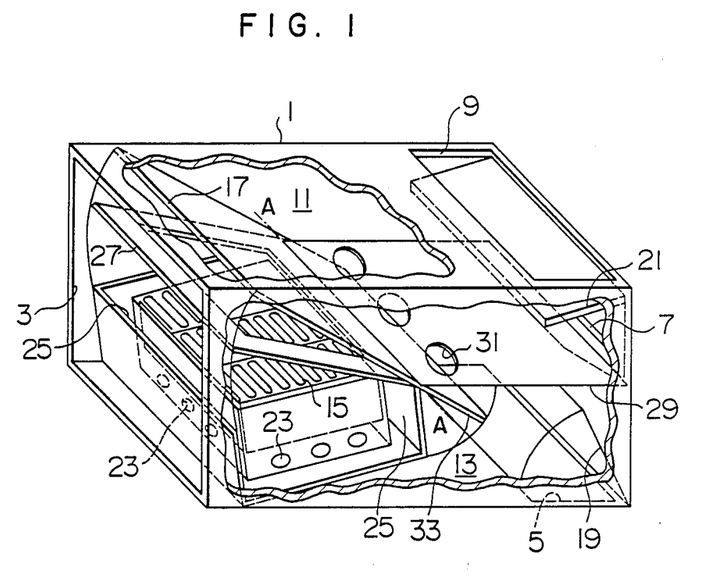
FIG. 1 is a partially broken-away perspective view of a heater unit according to an embodiment of the invention.
Figure 2:
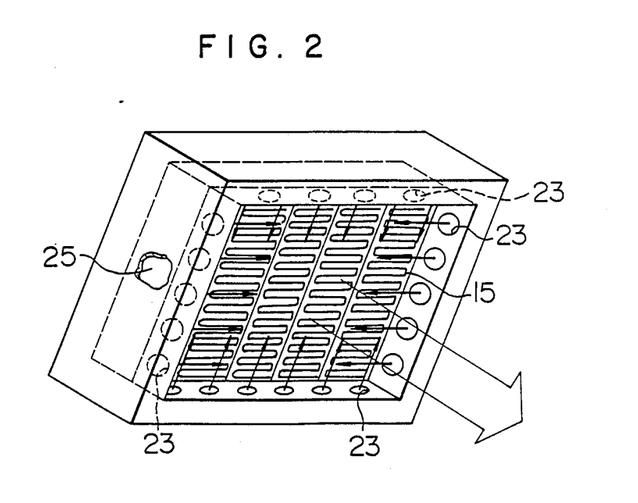
FIG. 2 is a perspective view of a heater core and cold-air nozzles shown in FIG. 1.

Referring to FIGS. 1 and 2, the heater unit according to the first embodiment comprises a duct case 1 which is provided with an inlet 3 and a plurality of discharge openings which include a FLOOR discharge opening 5, a VENT discharge opening 7 and a DEF (defrost) discharge opening 9. The duct case 1 has defined therewithin a cold-air passageway 11 and a hot-air passageway 13 which extend from the inlet 3 toward the discharge openings 5, 7 and 9.

Figure 3:
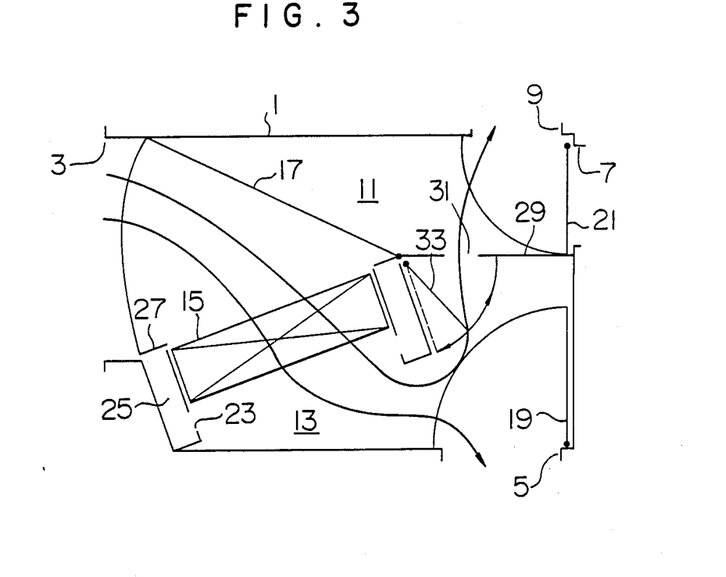
FIG. 3 is a diagrammatic cross-sectional view of the heater unit illustrated in FIG. 1, for explanation of a full-hot HEAT blowing mode.

Referring to FIG. 3, a heater core 15 is arranged within the hot-air passageway 13 for heating air flowing therethrough from the inlet 3 toward the discharge openings 5, 7 and 9 of the duct case 1.

An air-mixing damper 17 is arranged within the duct case 1 at a position upstream of the heater core 15. The air-mixing damper 17 is angularly movable about a pivot axis a-a extending laterally of the duct case 1 for adjusting flow rate of air flowing through the cold-air passageway 11 and flow rate of air flowing through the hot-air passageway 13.

A FLOOR damper 19 is pivotally mounted at the FLOOR discharge opening 5 provided in the duct case 1, for opening and closing the FLOOR discharge opening 5. Further, a common VENT/DEF damper 21 is pivotally mounted at the VENT discharge opening 7 and the DEF discharge opening 9 for opening and closing them. These dampers 19 and 21 are adapted to selectively open and close the discharge openings 5, 7 and 9 to switch blowing modes of the air conditioning system.

A plurality of air blowing openings in the form of cold-air nozzles 23 open to the hot-air passageway 13 at a location downstream of the heater core 15. The cold-air nozzles 23 are arranged about the hot-air passageway 13 in spaced relation to each other, and are directed substantially at right angles to a flow of the hot air having passed through the heater core 15. A cold-air bypass passage 25 is in the form of a rectangular ring surrounding the entire side surface of the heater core 15. The cold-air bypass passage 25 has a downstream end which communicates with the cold-air nozzles 23, for leading cold air around the heater core 15 to the cold-air nozzles 23. The cold air led by the cold-air bypass passage 25 is blown from the cold-air nozzles 23 into the flow of hot air having passed through the heater core 15 in such a fashion that the cold air flow from the cold nozzles 23 intersects the hot air flow. Thus, the cold air and the hot air are forcibly mixed with each other.

A bypass damper 27 in the form of a rectangular ring is arranged for angular movement about the pivotal axis a-a of the air-mixing damper 17. The bypass damper 27 is adapted to open and close an upstream end of the cold-air bypass passage 25 to adjust flow rate of the cold air blown through the cold-air nozzles 23.

A partition wall 29 is arranged within an air-mixing chamber downstream of the heater core 15 to partition the cold-air passageway 11 and the hot-air passageway 13. The partition wall 29 is provided therein with a plurality of hot-air nozzles 31 for blowing the hot air having issuing from the heater core 15, into flow of the cold air passing through the cold-air passageway 11. An auxiliary air-mixing damper 33 angularly movable about the pivotal axis a-a of the air-mixing damper 17 is adapted to adjust flow rate of the hot air blown through the hot-air nozzles 31.

The operation of the heater unit illustrated in FIGS. 1 and 2 will be described with reference to FIGS. 3 through 8.

FIG. 3 shows a full-hot HEAT blowing mode. The air-mixing damper 17 is moved to a full-hot position where the cold-air passageway 11 is fully closed, and the bypass damper 27 is moved to a position where the cold-air bypass passage 25 is fully closed. In the illustrated blowing mode, air from the inlet 3 entirely passes through the heater core 15 and is heated by the same to form hot air. The hot air is blown from the FLOOR discharge opening 5 and the DEF discharge opening 9. Air flow resistance at this full-hot HEAT blowing mode is equal to that of a usual heater unit, because there is no flow deflector or the like. In addition, angular movement of the auxiliary air-mixing damper 33 enables adjustment of flow rate of the hot air distributed to the DEF discharge opening 9.

Figure 4:
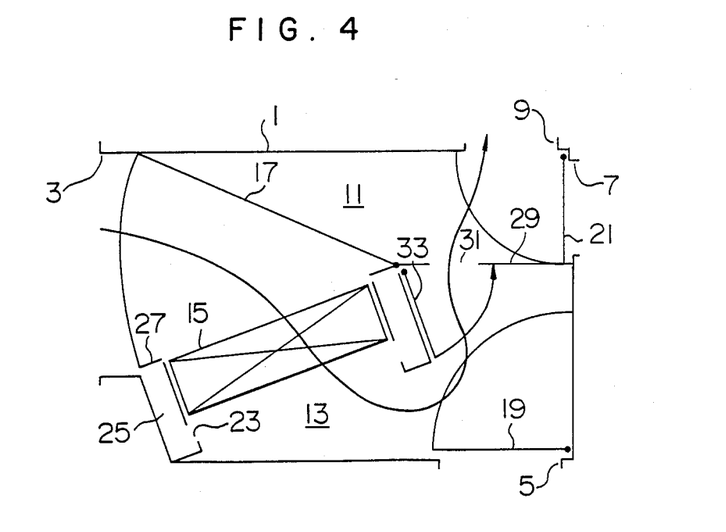
FIG. 4 is a view similar to FIG. 3, but for explanation of a full-hot DEF blowing mode.

FIG. 4 shows a full-hot DEF blowing mode. The air-mixing damper 17 is moved to the full-hot position, the FLOOR damper 19 is moved to a position where the FLOOR discharge opening 5 is fully closed, and the auxiliary air-mixing damper 33 is moved to a position where the hot-air nozzles 31 are fully opened. In the illustrated blowing mode, the hot air having passed through the heater core 15 entirely flows toward the DEF discharge opening 9.

Figure 5:
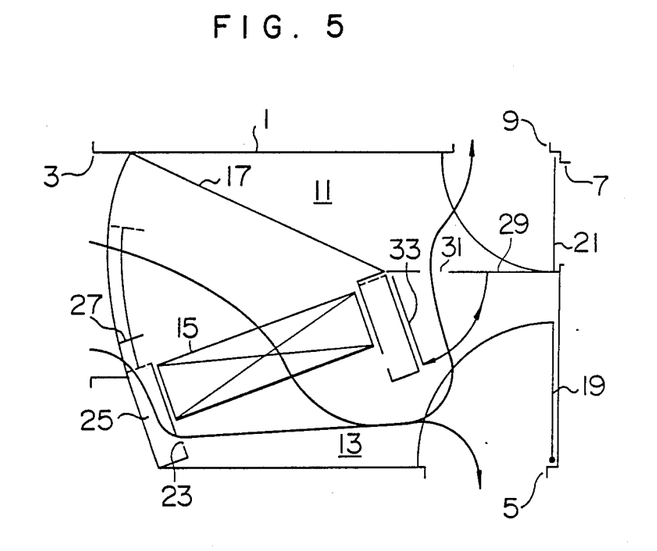
FIG. 5 is a view similar to FIG. 3, but showing temperature control of blown air at a HEAT blowing mode.

FIG. 5 shows temperature control of blown air at the HEAT blowing mode. With the air-mixing damper 17 fixed at the full-hot position, the opening degree of the bypass damper 27 is adjusted. Angular movement of the bypass damper 27 varies flow rate of the cold air which is blown into the flow of hot air after the cold air has passed around the heater core 15, through the cold-air bypass passage 25 and the cold-air nozzles 23. This makes it possible to adjust temperature of the hot air flowing toward the FLOOR discharge opening 5 and the DEF discharge opening 9. In this temperature adjustment, excellent air-mixing ability is achieved due to the effect of the cold air blown from the cold-air nozzles 23.

Figure 6:
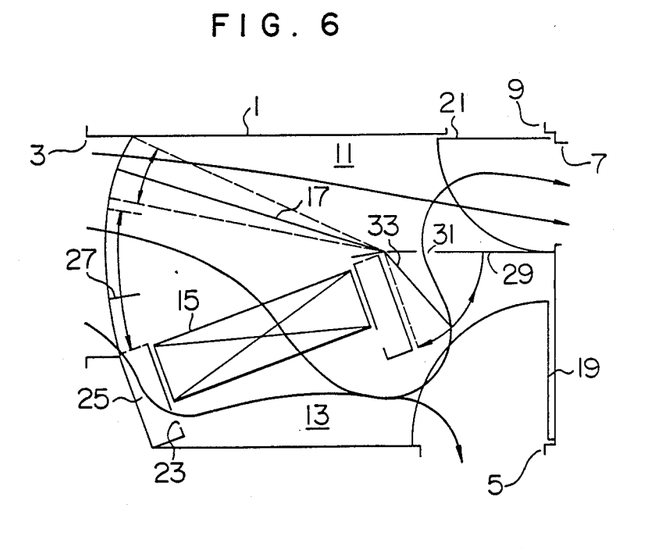
FIG. 6 is a view similar to FIG. 3, but showing temperature control of blown air at a B/L blowing mode.

FIG. 6 shows temperatute control of blown air at a B/L blowing mode. Three opening degrees including the opening degree of the bypass damper 27, the opening degree of the air-mixing damper 17 and the opening degree of the auxiliary air-mixing damper 33 are controlled independently of each other. A the opening degree of the bypass damper 27 increases the temperature of the air blown from the FLOOR discharge opening 5 decreases. As the air-mixing damper 17 is angularly moved toward the heater core 15, or as the opening degree of the auxiliary air-mixing damper 33 decreases, the temperature of the air blown from the VENT discharge opening 9 decreases. In this temperature adjustment, excellent air-mixing ability can be obtained due to the effects of the cold air blown from the cold-air nozzles 23 and the hot air blown from the hot-air nozzles 31.

Figure 7:
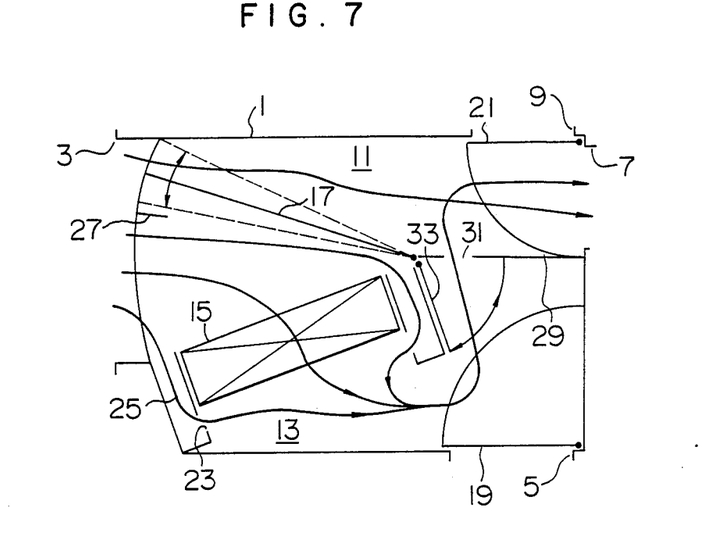
FIG. 7 is a view similar to FIG. 3, but showing temperature control of blown air at a VENT

FIG. 7 shows temperature control of blown air at a VENT blowing mode. The bypass damper 27 is fixed at an open position, and the auxiliary air-mixing damper 33 is moved to the fully open position. Under such state, the air-mixing damper 17 is adjusted in opening degree. As the air-mixing damper 17 is angularly moved toward the heater core 15, flow rate of the cold air flowing through an opening defined between the air-mixing damper 17 and the wall of the duct case 1 increases as compared with flow rate of the hot air blown from the hot-air nozzles 31 into the cold-air passageway 11. This lowers the temperature of the air blown from the VENT discharge opening 7. In this temperature adjustment, excellent air-mixing ability is achieved due to the effect of the hot air blown from the hot-air nozzles 31.

Figure 8:
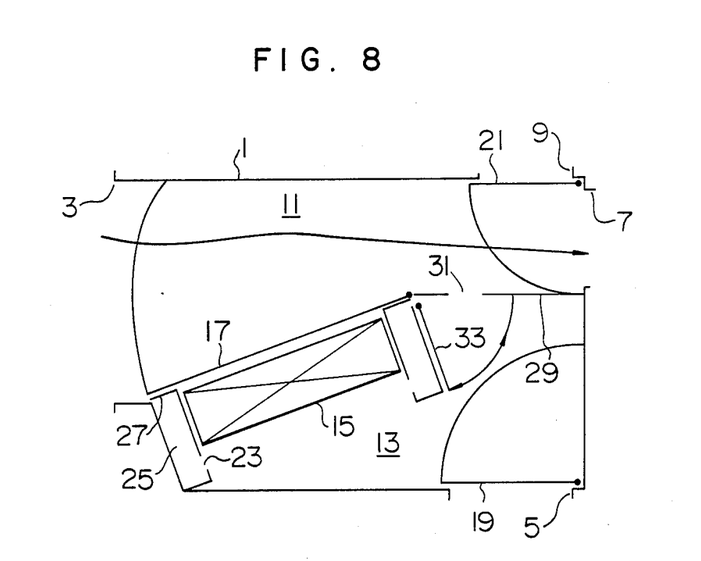
FIG. 8 is a view similar to FIG. 3, but for explanation of a full-cool VENT blowing mode.

FIG. 8 shows a full-cool VENT blowing mode. The air-mixing damper 17 is moved to a full-cool position where the hot-air passageway 13 is fully closed and the cold-air passageway 11 is fully opened. The bypass damper 27 is moved to the position where the hot-air bypass passage 25 is fully closed. Air flow resistance a this full-cool VENT blowing mode is equal to that of the usual heater unit, because there is no flow deflector or the like. Experiments have been conducted on the heater unit and reveal that, with the heater unit having a size equal to that of the usual heater unit, air-mixing ability having temperature variation within 10 degrees C. are obtained. In addition, air flow resistance of the heater unit at the maximum cooling and heating was equal to that of the usual heater unit.

A second embodiment of the invention will be described with reference to FIGS. 9 through 15. Like the first embodiment, a heater unit according to the second embodiment has an independent temperature adjusting function which can control temperature of air blown form the FLOOR blowing outlets and temperature of air blown from the VENT blowing outlets at the B/L blowing mode, independently of each other.

Figure 9:
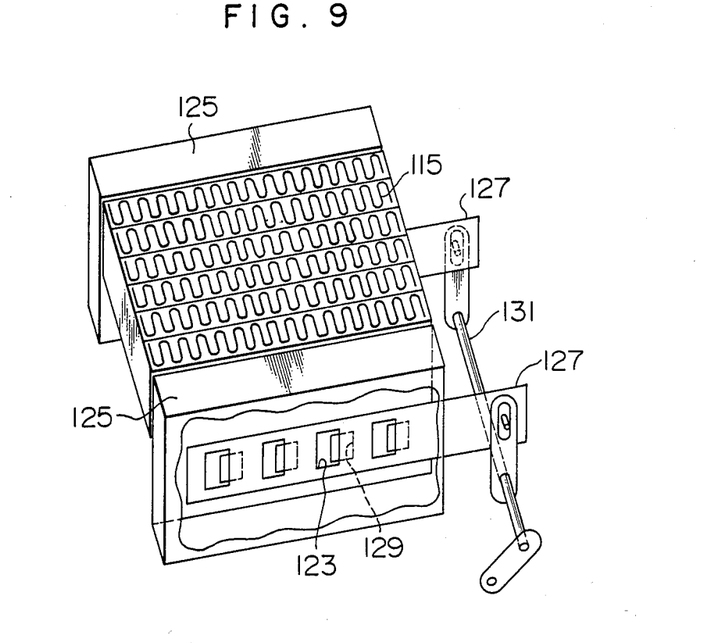
FIG. 9 is a perspective view showing an assembly of a heater core and cold-air nozzles of a heater unit according to another embodiment of the invention.
Figure 10:
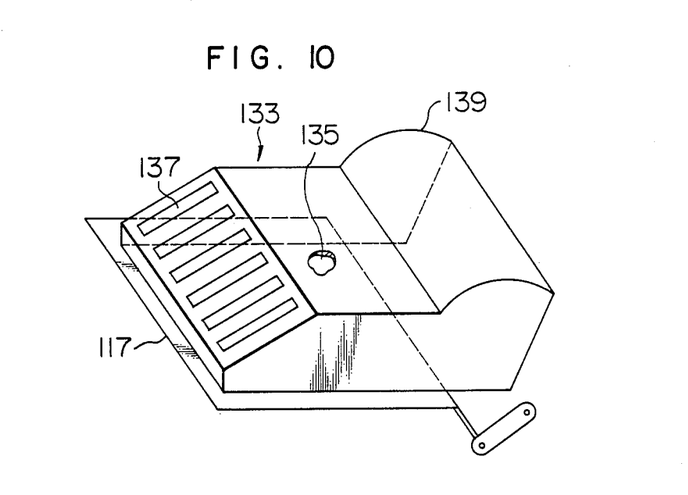
FIG. 10 is a perspective view showing an assembly of an air-mixing damper and hot-air nozzles, which is to be combined with the assembly illustrated in FIG. 9.
Figure 11:
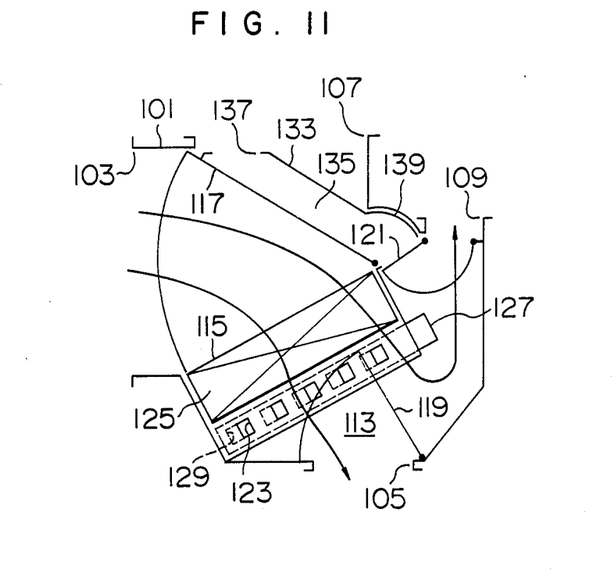
FIG. 11 is a diagrammatic cross-sectional view of the heater unit having the assemblies illustrated respectively in FIGS. 9 and 10, showing a full-hot HEAT blowing mode.

Referring to FIGS. 9 through 11, the heater unit comprises a duct case 101 which is provided with an inlet 103 and a plurality of discharge openings. The discharge openings include a FLOOR discharge opening 105, a VENT discharge opening 107 and a DEF discharge opening 109. The duct case 101 has defined therewithin a cold-air passageway 111 (see FIGS. 13 through 15) and a hot-air passageway 113 which extend from the inlet 103 toward the discharge openings 105, 107 and 109.

A heater core 115 is arranged within the hot-air passageway 113 for heating air flowing therethrough from the inlet 103 toward the discharge openings 105, 107 and 109 of the duct case 101.

An air-mixing damper 117 is arranged within the duct case 101 at a position upstream of the heater core 115. The air-mixing damper 117 is angularly movable about a pivot axis extending laterally of the duct case 101 for adjusting flow rat of air flowing through the cold-air passageway 111 and flow rate of air flowing through the hot-air passageway 113.

A FLOOR damper 119 is pivotally mounted at the FLOOR discharge opening 105 provided in the duct case 101, for opening and closing the FLOOR discharge opening 105. Further, a common VENT/DEF damper 121 is pivotally mounted at the VENT discharge opening 107 and the DEF discharge opening 109 for opening and closing them. These dampers 119 and 121 are adapted to selectively open and close the discharge openings 105, 107 and 109 to switch blowing modes of the air conditioning system.

A plurality of air blowing openings in the form of cold-air nozzles 123 open to the hot-air passageway 113 at a location downstream of the heater core 115. The cold-air nozzles 123 are directed substantially at right angles to flow of the hot air having passed through the heater core 115. The cold-air nozzles include a first group of cold-air nozzles 123 spaced from each other in a direction transverse to flow of the hot air passing through the hot-air passageway 113, and a second group of cold-air nozzles (not seen in the figures) spaced from each other in the transverse direction. The first and second groups of cold-air nozzles 123 face each other with the hot-air passageway 113 between them. A pair of cold-air bypass passages 125 extend respectively along a pair of opposite side faces of the heater core 115. The cold-air bypass passages 125 have their respective downstream ends which communicate respectively with the first and second groups of cold-air nozzles 123, for leading cold air around the heater core 115 to the cold-air nozzles 123. The cold air led by the cold-air bypass passages 125 is blown from the cold-air nozzles 123 into the flow of hot air having passed through the heater core 115 in such a fashion that the cold, air flow from the cold-air nozzles 123 intersects the hot air flow. Thus, the cold air and the hot air are forcibly mixed with each other.

A pair of slide plates 127 are associated respectively with the first and second groups of cold-air nozzles 123. One of the pair of slide plates 127 is formed with a plurality of openings 129 corresponding respectively to the cold-air nozzles 123 of the first group, while the other slide plate 127 is formed with a plurality of openings (not seen in the figures) corresponding respectively to the cold-air nozzles of the second group. The slide plates 127 are slidable by means of a linkage 131 between an open position where the openings 129 provided in the slide plates 127 overlap respectively the cold-air nozzles 123 of the first and second groups to fully open the cold-air nozzles 123 and a closed position where the openings 129 provided in the slide plates 127 are displaced respectively from the cold-air nozzles 123 of the first and second groups to fully close the cold-air nozzles 123. In this manner, the slide plates 127 are adapted to vary opening areas of the respective cold-air nozzles 123, thereby adjusting flow rate of the cold air blown from the cold-air nozzles 123. The cold-air nozzles 123 and the openings 129 in the slide plates 127 are each formed into an elongated shape along the flow of hot air having passed through the heater core 115. By means of such elongated shape, the flow of cold air blown into the flow of hot air is such that the cold air flow reaches a center of the hot air flow and further improves air-mixing ability.

A bypass duct 133 is fixedly mounted on the air-mixing damper 117 for angular movement together therewith. The bypass duct 133 cooperates with the air-mixing damper 117 to define therebetween a hot-air bypass passage 135. A plurality of slit-like blowing openings in the form of hot-air nozzles 137 open to the cold-air passageway 111 adjacent a free end of the air-mixing damper 117, that is, at a location downstream of the same. The hot-air nozzles 137 are directed substantially at right angles to the flow of cold air passing through the cold-air passageway 111, and are formed into an elongated shape along the flow of cold air passing through the cold-air passageway 111. The bypass duct 133 has an end 139 formed into a generally semi-cylindrical shape which is in slidable contact with the duct case 101. By virtue of this semi-cylindrical end 139, it is ensured that anywhere the air-mixing damper 117 moves angularly, the hot-air bypass passage 135 communicates with a location downstream of the heater core 115. The hot air led by the hot-air bypass passage 135 is blown from the hot-air nozzles 137 into the flow of cold air passing through the cold-air passageway 111 in such a fashion that the hot air flow from the hot-air nozzles 137 intersects the cold air flow. Thus, the hot air and the cold air are forcibly mixed with each other.

The second embodiment aims at reduction in size and reduction in flow resistance at the maximum cooling and heating, while nevertheless obtaining excellent air-mixing ability. To this end, as will clearly be appreciated from FIG. 11, the VENT discharge opening 107 is provided in the duct case 101 at a location just above the heater core 115 and the air-mixing damper 117 at a location substantially apposed to an upstream end face of the heater core 115. In addition, the FLOOR discharge opening 105 is provided in the duct case 101 at a location just below the heater core 115, that is, at a location substantially opposed to a downstream end face of the heater core 115. With such an arrangement, it is possible to reduce the size in the horizontal direction as viewed in FIG. 11, and to reduce air flow resistance. However, the air-mixing ability decreases correspondingly. In order to compensate for such decrease in the air-mixing ability, the opening areas of the respective cold-air nozzles 123 are adjusted by the slide plates 127 as described above. Specifically, when flow rate of cold air blown from the cold-air nozzles 123 into the flow of hot air having passed through the heater core 115 is low, that is, when the cold-air nozzles 123 are restricted in opening degree by the slide plates 127, the flow velocity of the cold air blown from the cold-air nozzles 123 becomes high so that the cold-air flow reaches a center of the hot-air flow, thereby making it possible to further improve the air-mixing ability.

The operation of the second embodiment constructed as above will be described below with reference to FIGS. 11 through 15.

FIG. 11 shows a full-hot HEAT blowing mode. The air-mixing damper 117 is in a full-hot position where the cold-air passageway 111 is fully closed, and the slide plates 127 are moved to a position where the cold-air nozzles 123 are fully closed. The FLOOR damper 119 assumes a position of an intermediate opening degree, and the VENT/DEF damper 121 is moved to a position where the hot-air bypass passage 135 is fully closed and the DEF discharge opening 109 is fully opened. In the illustrated blowing mode, air from the inlet 103 entirely passes through the heater core 115 to form hot air. The hot air is divided by the forward tip of the FLOOR damper 119, and is blown from the FLOOR discharge opening 105 and the DEF discharge opening 109. Adjustment of the angular position of the FLOOR damper 119 makes it possible to vary a ratio between flow rate of the air directed toward the FLOOR discharge opening 105 and flow rate of the air directed toward the DEF discharge opening 109. Since the FLOOR discharge opening 105 is located just below the heater core 115, air flow resistance is extremely low. A the FLOOR damper 119 is moved to a position where the FLOOR discharge opening 105 is fully closed, the air conditioning system is brought to a full-hot DEF blowing mode.

Figure 12:
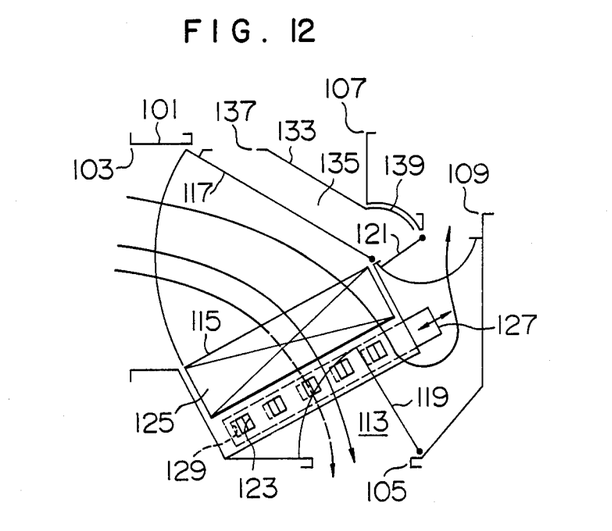
FIG. 12 is a view similar to FIG. 11, but showing temperature control of blown air at a HEAT blowing mode.

FIG. 12 shows temperature control of blown air at the HEAT blowing mode. With the air-mixing damper 117 fixed at the full-hot position, the slide plates 127 are adjusted in position. Sliding movement of the slide plates 127 varies the opening areas of the respective cold-air nozzles 123, to adjust flow rate of the cold air blown from the cold-air nozzles 123 into the hot air having passed through the heater core 115. Thus, it is possible to control temperature of air blown from the FLOOR discahrge opening 105 and the DEF discharge opening 109. In this temperature adjustment, excellent air-mixing ability is achieved even when the flow rate of the blown cold air is low, because the opening areas of the respective cold-air nozzles 123 are restricted by the slide plates 127.

Figure 13:
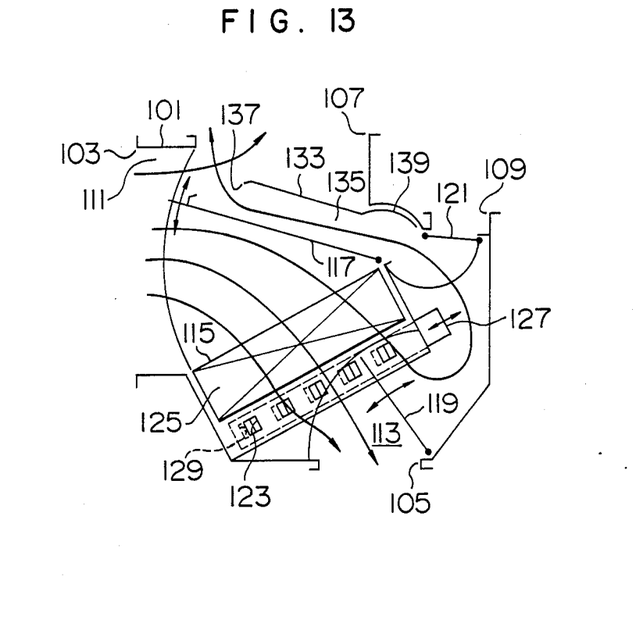
FIG. 13 is a view similar to FIG. 11, but showing temperature control of blown air at a B/L blowing mode.

FIG. 13 shows temperature control of blown air at the B/L blowing mode. With the VENT/DEF damper 121 fixed at a position where the DEF discharge opening 109 is fully closed, three positions including the position of the air-mixing damper 117, the position of the slide plates 127 and the position of the FLOOR damper 119 are controlled independently of each other. The temperature of the air blown from the FLOOR discharge opening 105 varies depending upon only the position of the slide plates 127, and is brought to an appropirate value by adjustment of the slide plates 127. The temperature of the air blown from the VENT discharge opening 107 varies depending upon both the position of the air-mixing damper 117 and the position of the FLOOR damper 119. There are many combinations of the position of the air-mixing damper 117 and the position of the FLOOR damper 119, at which positional combinations the temperature of the air blown from the VENT discharge opening 107 is brought to the same value. Depending upon the positional combinations, however, the flow rate of air blown from the VENT discharge opening 107 varies. That is to say, it is possible to control the temperature of the air blown from the VENT discharge opening 107 and the temperature of the air blown from the FLOOR discharge opening 105 independently of each other and, at the same time, it is possible to control the flow rate of the air blown from the VENT discharge opening 107 and the flow rate of the air blown from the FLOOR discharge opening 105 independently of each other. In the mode of operation illustrated in FIG. 13, excellent air-mixing ability can be obtained due to the effects of the cold-air nozzles 123 and the hot-air nozzles 137.

Figure 14:
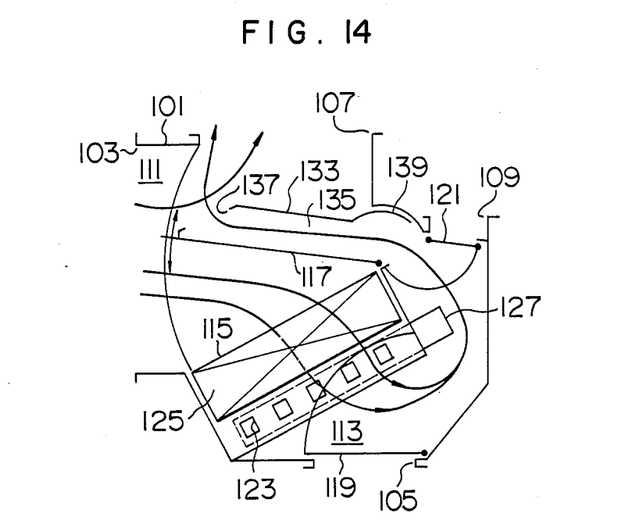
FIG. 14 is a view similar to FIG. 11, but showing temperature control of blown air at a VENT blowing mode.

FIG. 14 shows temperature control of blown air at the VENT blowing mode. The FLOOR damper 119 is moved to the position where the FLOOR discharge opening 105 is fully closed, and the VENT/DEF damper 121 is moved to the position where the DEF discharge opening 109 is fully closed. In addition, the slide plates 127 are fixed at the position where the cold-air nozzles 123 are fully opened. Under such state, the opening degree of the air-mixing damper 117 is adjusted. In this mode, excellent air-mixing ability is achieved due to the effect of the hot-air nozzles 137.

Figure 15:
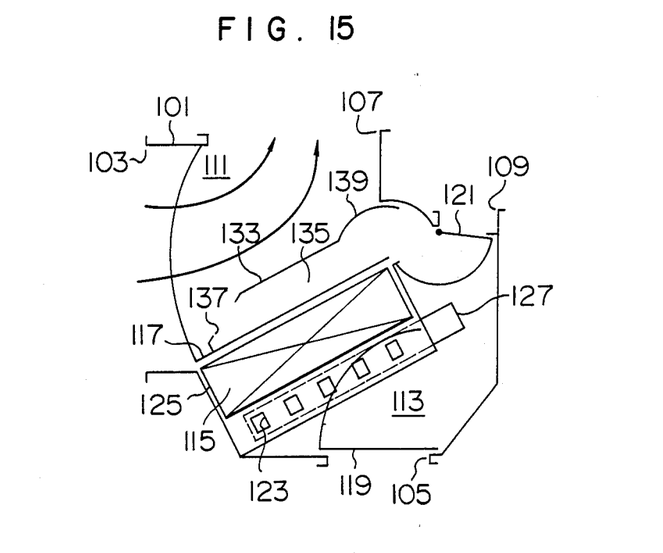
FIG. 15 is a view similar to FIG. 11, but showing a full-cool VENT blowing mode.

FIG. 15 shows a full-cool VENT blowing mode. The air-mixing damper 117 is moved to a full-cool position where the hot-air passageway 113 is fully closed and the cold-air passageway 111 is fully opened. The VENT/DEF damper 121 is moved to the position where the DEF discharge opening 109 is fully closed. In addition, the FLOOR damper 119 is moved to the position where the FLOOR discharge opening 105 is fully closed. In the illustrated mode, since the VENT discharge opening 107 is located just above the air-mixing damper 117, air flow resistance is reduced to an extremely low value. Experimental result conducted on this second embodiment revealed that the heater unit had a 30% reduced volume and had 40% reduced air flow resistance at the maximum cooling and heating, as compared with the usual heater unit. In addition, it was also found that the heater unit according to the second embodiment could obtain the air-mixing ability having temperature variation within 10 degrees C.

Figure 16:
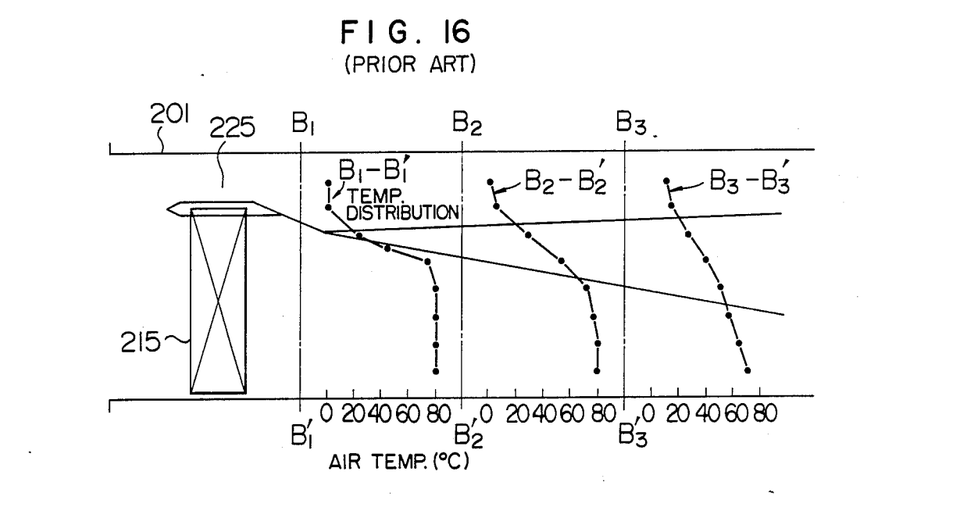
FIG. 16 is a graphical representation of results of a basic experiment conducted on a test arrangement corresponding to a conventional air conditioning system.
Figure 17:
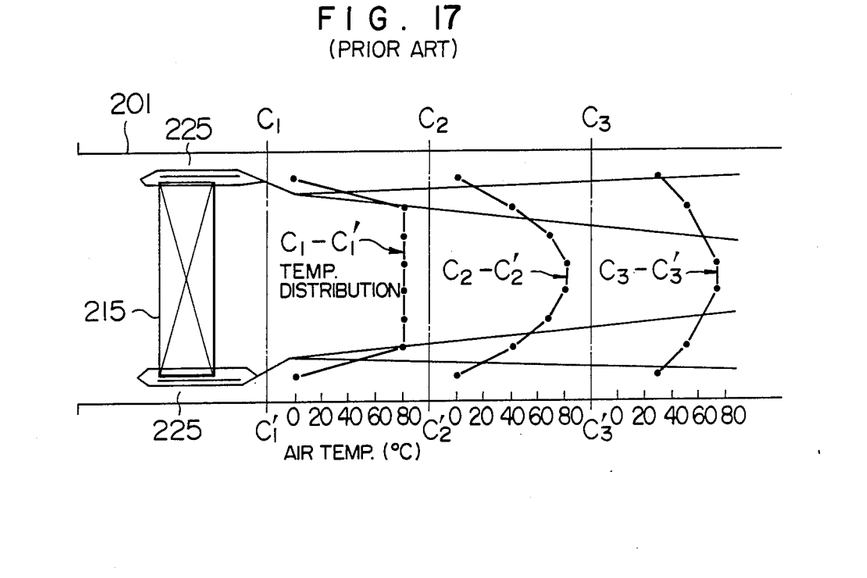
FIG. 17 is a graphical representation of results of a basic experiment conducted on a test arrangement corresponding to another conventional air conditioning system.
Figure 18:
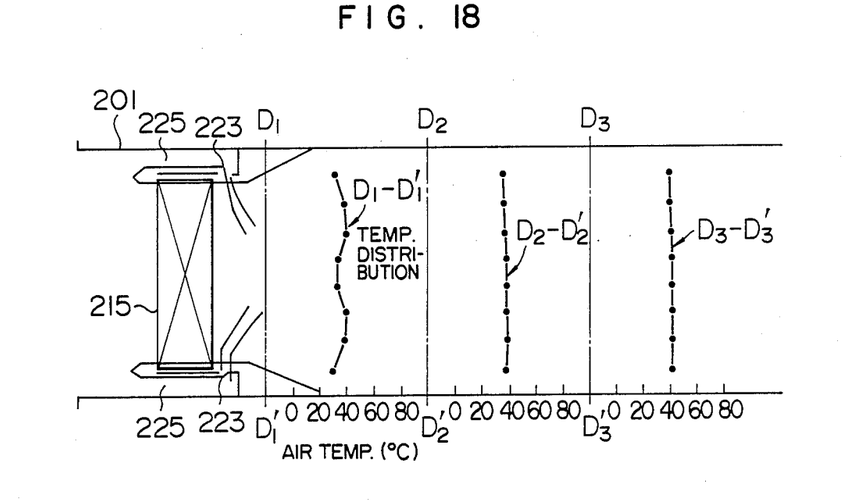
FIG. 18 is a graphical representation of results of a basic experiment conducted on a test arrangement corresponding to the air conditioning system of the invention.

FIGS. 16 through 18 show results of the basic experiments comparing the invention with conventional heater units.

FIG. 16 illustrates a test arrangement in which a heater core 215 is arranged adjacent an upstream end of a duct 201 and is located against one side wall of the duct 201 to define a cold-air bypass passage 225 between the opposite side wall of the duct 201 and a confronting side face of the heater core 215. The structure shown in FIG. 16 is equivalent to the conventional air-mixing structure. An experiment was conducted in such a manner that hot water of 80 degrees C was caused to flow through the heater core 215, and cold air of 0 degree C was caused to flow from the upstream end of the duct 201, that is, from the left-hand end thereof as viewed in the figure. Temperature of air was measured on lines $B_1-B_1'$, $B_2-B_2'$ and $B_3-B_3'$. The measurement results are represented by temperature distributions in FIG. 16.

As will be understood from the experimental results shown in FIG. 16, the air temperature does not become uniform even on the line $B_3-B_3'$ which is remote from the heater core 215, and temperature variation of about 60 degrees C remains at the line $B_3-B_3'$. This is due to the fact that the hot air and the cold air flow in the same direction to form laminar flow having a layer of hot-air and a layer of cold-air, and mixing of the hot air and the cold air proceeds only slowly at the boundary between the hot-air and cold-air layers.

FIG. 17 shows a test arrangement in which the heater core 215 is arranged adjacent the upstream end of the duct 201 in a floating fashion to define the cold-air bypass passage 225 in the form of a rectangular ring between the entire side surface of the heater core 215 and the peripheral wall of the duct 201. The test arrangement shown in FIG. 17 is equivalent to another conventional air-mixing structure. An experiment was conducted in a manner like the experiment conducted on the test arrangement illustrated in FIG. 16. The experimental results are indicated in FIG. 17.

As will be understood from the experimental results shown in FIG. 17, the air temperature does not become uniform even on a line $C_3-C_3'$ which is remote from the heater core 215, and temperature variation of about 35 degrees C remains at the line $C_3-C_3'$. This is due to the laminar flow phenomenon like the test arrangement of FIG. 16. However, the temperature variation is reduced from 60 degrees C to 35 degrees C, as compared with the test arrangement of FIG. 16. This is due to the fact that the boundary between the hot-air and cold-air layers is in the form of a cylindrical shape, and the area of the boundary increases.

FIG. 18 shows a test arrangement in which the heater core 215 is arranged adjacent the upstream end of the duct 201 in a floating fashion to define the cold-air bypass passage 225 in the form of a rectangular ring between the entire side surface of the heater core 215 and the peripheral wall of the duct 201, and in which a plurality of nozzles 223 are provided at the downstream end of the cold-air bypass passage 225. The test arrangement shown in FIG. 17 has the air-mixing structure according to the invention. An experiment was conducted in a manner like the experiment conducted on the test arrangement illustrated in each of FIGS. 16 and 17. The experimental results are indicated in FIG. 18.

As will be understood from the experimental results shown in FIG. 18, the air temperature becomes substantially uniform on a line $D_1-D_1'$ spaced from the heater core 215 a distance of the order of the thickness of the heater core 215, and temperature variation of only about 10 degrees C remains at the line $D_1-D_1'$. Further, the temperature of air becomes uniform substantially completely on a line $D_3-D_3'$ remote from the heater core 215, and temperature variation of only 2 to 3 degrees C remains on the line $D_3-D_3'$. This is due to the fact that because flow velocity of the cold air blown from the nozzles 223 into flow of the hot air is higher than that of the hot air, the cold air quickly reaches a center of the hot-air flow, and that because the cold air is blown in the form of a plurality of fine jets into the hot-air flow, the cold air is immediately mixed with the hot air.

It will be understood from the above experiments that the heater unit having incorporated therein the air-mixing structure according to the invention has extremely superior characteristics, and excellent air-mixing ability can be obtained even if the air-mixing chamber is reduced in volume.

As described above, according to the invention, there can be provided the air conditioning system for a vehicle, which is small in size, high in air-mixing ability and simple in construction.

What is claimed is:

1. An air conditioning system for a vehicle, comprising:
   a duct case provided with an inlet and discharge opening means, said duct case having defined therewithin a cold-air passageway and a hot-air passageway which extend from said inlet toward said discharge opening means;
   heater means arranged within said hot-air passageway for heating air flowing through said hot-air passageway from said inlet toward said discharge opening means of said duct case;
   air-mixing damper means arranged for angular movement within said duct case at a location upstream of said heater means, for adjusting flow rate of air passing through said cold-air passageway and flow rate of air passing through said hot-air passageway;
   mode switching damper means arranged in association with said discharge opening means provided in said duct case, for switching blowing modes; and
   air mixing means including a plurality of cold-air blowing openings which open to said hot-air passageway at a location downstream of and adjacent to said heater means, and cold-air bypass passage means for leading cold air around said heater means to said cold-air blowing openings, wherein the cold air led by said cold-air bypass passage means is blown from said cold-air blowing openings into flow of hot air having passed through said heater means in such a fashion that flow of the cold air from said cold-air blowing openings is intersected with the hot-air flow, thereby forcibly mixing the cold air and the hot air with each other.

2. An air conditioning system as defined in claim 1, wherein each of said cold-air blowing openings is in the form of a cold-air nozzle.

3. An air conditioning system as defined in claim 2, wherein the col-air nozzles are directed substantially at right angles to the flow of hot air having passed through said heater means.

4. An air conditioning system as defined in claim 1, including:
   cold-air flow rate adjusting means for adjusting flow rate of cold air blown through said cold-air blowing openings.

5. An air conditioning system as defined in claim 4, wherein said cold-air bypass passage means has a downstream end communicating with said cold-air blowing openings, and said cold-air flow rate adjusting means comprises an angularly movable bypass damper for opening and closing an upstream end of said cold-air bypass passage means.

6. An air conditioning system as defined in claim 5, wherein said heater means comprises a heater core, said cold-air bypass passage means is in the form of a rectangular ring entirely surrounding a side surface of said heater core, and said bypass damper is in the form of a rectangular ring, said cold-air blowing openings being arranged in spaced relation to each other about said hot-air passageway.

7. An air conditioning system as defined in claim 4, wherein said cold-air flow rate adjusting means is operative to adjust opening areas of the respective cold-air blowing openings.

8. An air conditioning system as defined in claim 7, wherein said cold-air flow rate adjusting means comprises slidable plate means provided with a plurality of openings corresponding respectively to said cold-air blowing openings, said plate means being slidable between an open position where said openings provided in said plate means overlap respectively said cold-air blowing openings to fully open the same and a closed position where said openings provided in said plate means are displaced respectively from said cold-air blowing openings to fully close the same.

9. An air conditioning system as defined in claim 8, wherein said cold-air blowing openings and said openings provided in said plate means are each formed into an elongated shape along flow of hot air having passed through said heater means.

10. An air conditioning system as defined in claim 8, wherein said cold-air blowing openings include a first group of openings arranged in spaced relation to each other in a direction transverse to flow of hot air passing through said hot-air passageway, and a second group of openings arranged in spaced relation to each other in the transverse direction, said first and second groups of openings facing each other with said hot-air passageway between them.

11. An air conditioning system as defined in claim 10, wherein said plate means comprises a pair of slide plates associated respectively with said first and second groups of openings.

12. An air conditioning system as defined in claim 11, wherein said heater means comprises a heater core, and said cold-air bypass passage means comprises a pair of bypass passages extending respectively along a pair of opposite side faces of said heater core.

13. An air conditioning system as defined in claim 1, including:
   a partition wall arranged between said cold-air passageway and said hot-air passageway at a location downstream of said heater means;
   a plurality of hot-air nozzles provided in said partition wall for blowing hot air having passed through said heater means into flow of cold air passing through said cold-air passageway; and
   hot-air flow rate adjusting means for adjusting flow rate of the hot air blown from said hot-air nozzles.

14. An air conditioning system as defined in claim 13, wherein said hot-air flow rate adjusting means comprises an angularly movable damper.

15. An air conditioning system as defined in claim 1, including:
   second air mixing means comprising a plurality of hot-air blowing openings which open to said cold-air passageway at a location downstream of said air-mixing damper means, and hot-air bypass passage means for leading hot air having passed through said heater means to said hot-air blowing openings, wherein the hot air led by said hot-air bypass passage means is blown from said hot-air blowing openings into flow of cold air passing through said cold-air passageway in such a fashion that flow of the hot air from said hot-air blowing openings is intersected with the cold-air flow, thereby forcibly mixing the hot air and the cold air with each other.

16. An air conditioning system as defined in claim 15, wherein each of said hot-air blowing openings is in the form of a hot-air nozzle.

17. An air conditioning system as defined in claim 16, wherein the hot-air nozzles are directed substantially at right angles to the flow of cold air passing through said cold-air passageway.

18. An air conditioning system as defined in claim 15, wherein said hot-air blowing openings are each formed into an elongated shape along flow of the cold air passing through said cold-air passageway, and said cold-air blowing openings are each formed into an elongated shape along flow of the hot air after having passed through said heater means 19. An air conditioning system as defined in claim 15, wherein said hot-air bypass passage means is defined by a bypass duct mounted on said air-mixing damper means for angular movement together therewith, said hot-air blowing openings opening adjacent a free end of said air-mixing damper means.

20. An air conditioning system as defined in claim 15, wherein said heater means comprises a heater core, and said discharge opening means provided in said duct case comprises a plurality of discharge openings, a first one of said discharge openings being provided in said duct case at a location substantially confronted with an upstream end face of said heater core, and a second one of said discharge openings being provided in said duct case at a location substantially confronted with a downstream end face of said heater core.

* * * * *